(12) United States Patent
Dodson et al.

(10) Patent No.: US 12,326,973 B2
(45) Date of Patent: Jun. 10, 2025

(54) ELECTRONIC DEVICE WITH OPTICAL SENSOR FOR COLOR DETECTION

(71) Applicant: Apple Inc., Cupertino, CA (US)

(72) Inventors: Christopher M Dodson, Denver, CO (US); Kenneth J Vampola, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/443,164

(22) Filed: Feb. 15, 2024

(65) Prior Publication Data

US 2024/0329733 A1 Oct. 3, 2024

Related U.S. Application Data

(60) Provisional application No. 63/492,732, filed on Mar. 28, 2023.

(51) Int. Cl.
| | |
|---|---|
| *G06F 3/01* | (2006.01) |
| *G01J 1/42* | (2006.01) |
| *G06F 3/02* | (2006.01) |
| *G06F 3/0354* | (2013.01) |
| *G06F 3/16* | (2006.01) |
| *G06T 5/00* | (2024.01) |

(52) U.S. Cl.
CPC ............ *G06F 3/013* (2013.01); *G01J 1/4204* (2013.01); *G06F 3/02* (2013.01); *G06F 3/03545* (2013.01); *G06F 3/167* (2013.01); *G06T 5/00* (2013.01)

(58) Field of Classification Search
CPC ........ G06F 3/013; G06F 3/02; G06F 3/03545; G06F 3/167; G01J 1/4204; G06T 5/00
See application file for complete search history.

(56) References Cited

U.S. PATENT DOCUMENTS

| | | | |
|---|---|---|---|
| 6,377,249 B1 * | 4/2002 | Mumford | G06F 3/03542 345/173 |
| 8,531,355 B2 * | 9/2013 | Maltz | G02B 27/0093 455/556.1 |
| 9,323,348 B2 | 4/2016 | Nungester et al. | |
| 9,665,187 B2 | 5/2017 | Shu | |
| 10,694,607 B1 | 6/2020 | Xu et al. | |

(Continued)

FOREIGN PATENT DOCUMENTS

| | | |
|---|---|---|
| CN | 106249921 A | 12/2016 |
| CN | 111796684 A | 10/2020 |

(Continued)

*Primary Examiner* — Mihir K Rayan
(74) *Attorney, Agent, or Firm* — Treyz Law Group, P.C.; David K. Cole (57) ABSTRACT

A head-mounted device may have a gaze tracking system and an optical sensor. The gaze tracking system may include a camera, ambient light sensor, or other optical sensor to determine an angle/direction of a user's gaze. The optical sensor may be a camera, directional color ambient light sensor, or other optical sensor. After determining the user's gaze, the optical sensor may be used to determine the color of an external object in the direction of the determined angle/direction. For example, the color of the external object may be determined in response to an input from the user, such as a button press, a voice command, or a blink. The determined color may be used as an input color in a virtual space or on another device.

18 Claims, 6 Drawing Sheets

(56) References Cited

U.S. PATENT DOCUMENTS

| | | |
|---|---|---|
| 10,976,838 B2 | 4/2021 | Ivanov |
| 11,126,281 B2 | 9/2021 | Lewty et al. |
| 11,249,305 B2 * | 2/2022 | Koo ..................... G06V 20/20 |
| 2010/0128064 A1 | 5/2010 | Taylor et al. |
| 2012/0331546 A1 | 12/2012 | Falkenburg et al. |
| 2014/0085265 A1 * | 3/2014 | Yin ..................... G06F 3/0304 |
| | | 250/208.2 |
| 2014/0152576 A1 | 6/2014 | Kim et al. |
| 2014/0253780 A1 | 9/2014 | Shih |
| 2015/0206506 A1 | 7/2015 | Lee et al. |
| 2015/0212602 A1 | 7/2015 | Lor et al. |
| 2015/0286293 A1 | 10/2015 | Gruhlke et al. |
| 2016/0034052 A1 | 2/2016 | Shu |
| 2016/0048221 A1 | 2/2016 | Boulanger |
| 2016/0334891 A1 | 11/2016 | Ozoemenam et al. |
| 2016/0357343 A1 | 12/2016 | Falkenburg et al. |
| 2017/0308015 A1 | 10/2017 | Nakase et al. |
| 2018/0081456 A1 | 3/2018 | Li et al. |
| 2019/0290148 A1 | 9/2019 | Kang et al. |
| 2020/0103988 A1 | 4/2020 | Jeon et al. |
| 2020/0168120 A1 | 5/2020 | Rodriguez Bravo |
| 2020/0225778 A1 * | 7/2020 | Lewty ................. G06F 3/04883 |
| 2021/0004995 A1 * | 1/2021 | Burg ......................... G01J 3/50 |
| 2021/0041288 A1 | 2/2021 | Hung et al. |
| 2021/0124432 A1 | 4/2021 | Nicholson et al. |
| 2021/0209364 A1 | 7/2021 | Park et al. |
| 2021/0290046 A1 | 9/2021 | Nazareth et al. |
| 2021/0389181 A1 | 12/2021 | Siess et al. |
| 2022/0058879 A1 * | 2/2022 | Rohan ................. G06V 30/1478 |
| 2022/0413636 A1 | 12/2022 | Lu et al. |

FOREIGN PATENT DOCUMENTS

| | | |
|---|---|---|
| KR | 20200071287 A | 6/2020 |
| KR | 20220086939 A | 6/2022 |
| WO | 2017188470 A1 | 11/2017 |
| WO | 2020193733 A1 | 10/2020 |
| WO | 2022074047 A1 | 4/2022 |

* cited by examiner

ELECTRONIC DEVICE WITH OPTICAL SENSOR FOR COLOR DETECTION

This application claims the benefit of U.S. provisional patent application No. 63/492,732, filed Mar. 28, 2023, which is hereby incorporated by reference herein in its entirety.

FIELD

This relates generally to systems that include electronic devices, such as head-mounted devices.

BACKGROUND

Electronic devices, such as head-mounted devices, may have environmental sensors for sensing an environment external to the devices. These environmental sensors may include optical sensors or other sensors.

SUMMARY

A head-mounted device may have a gaze tracking system and an external optical sensor. The gaze tracking system may include a camera, ambient light sensor, or other optical sensor. The optical sensor of the gaze tracking system may face the user and determine an angle/direction of a user's gaze, or may otherwise track the user's eyes.

The external optical sensor may be a camera, directional color ambient light sensor, or other optical sensor. After determining the user's gaze, the external optical sensor may be used to determine the color of an external object in the direction of the determined angle/direction. In other words, the external optical sensor may be used to determine the color of an object at which the user is looking.

The head-mounted device may include an additional ambient light sensor or other optical sensor to determine the color shift imparted to the external object from an external light source. The measured color of the external object may then be adjusted based on information from the additional ambient light sensor. For example, a white point may be adjusted or the color may be corrected.

The color of the external object may be determined in response to an input from the user, such as a button press, a voice command, or a blink. After determining the color of the external object, the determined color may be used as an input color in a virtual space or on another device.

DETAILED DESCRIPTION

Electronic devices such as head-mounted devices may include displays and other components for presenting content to users. A head-mounted device may have head-mounted support structures that allow the head-mounted device to be worn on a user's head. The head-mounted support structures may support optical components such as displays for displaying visual content and front-facing cameras for capturing real-world images. In an illustrative configuration, optical components such as waveguides may be used to provide images from display projectors to eye boxes for viewing by a user.

The head-mounted device may have sensors. For example, optical sensors, such as cameras and/or ambient light sensors, may measure light from the environment of the head-mounted device. In some embodiments, it may be desirable to measure the color of external objects using these sensors. For example, a gaze tracking system in the head-mounted device may determine a direction of the user's gaze, and external optical sensors may determine the color of an external object at which the user is looking (e.g., at the angle of the user's gaze). The measured color may be corrected based on measurements from additional optical sensors, if desired.

The device may then make adjustments based on the measured color. For example, a color input in augmented reality, mixed reality, or virtual reality may be adjusted based on the measured color. As another example, a color input from a stylus on a second device, such as a table, may be adjusted based on the measured color.

Figure 1:
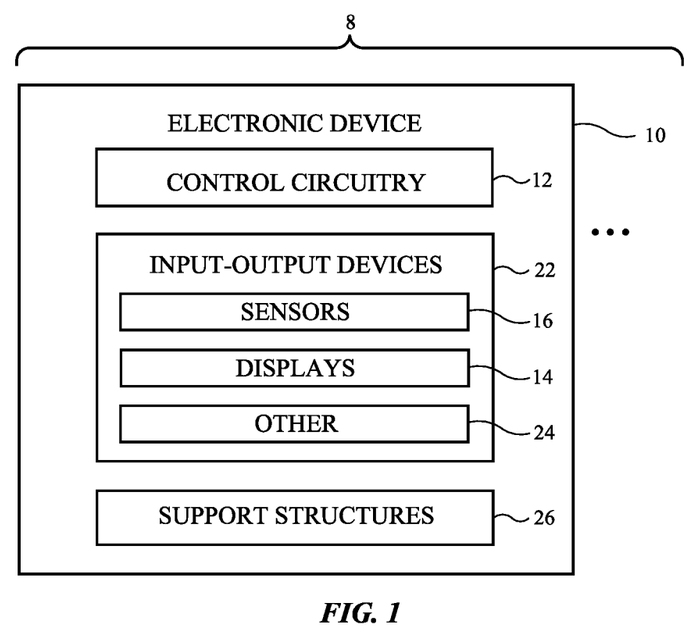
FIG. 1 is a schematic diagram of an illustrative system in accordance with some embodiments.

A schematic diagram of an illustrative system that may include a head-mounted device that can measure the colors of external objects is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WIFI® circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

The communications circuitry may include antennas, radio-frequency transceiver circuitry, and other wireless communications circuitry and/or wired communications circuitry. The communications circuitry may, for example, support bidirectional wireless communications between devices 10 over a wireless link (e.g., a wireless local area network link, a near-field communications link, or other suitable wired or wireless communications link (e.g., a Bluetooth® link, a WiFi® link, a 60 GHz link or other millimeter wave link, etc.)). Devices 10 may also include power circuits for transmitting and/or receiving wired and/or wireless power (e.g., inductive power coils for transmitting and receiving wireless power) and may include batteries. In configurations in which wireless power transfer is supported between devices 10, in-band wireless communications may be supported using inductive power transfer coils (as an example).

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as displays 14. In some configurations, device 10 includes left and right display devices (e.g., left and right components such as left and right projectors based on scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively. Illustrative configurations in which device 10 has left and right display devices such as left and right projectors that provide respective left and right images for a user's left and right eyes may sometimes be described herein as an example. In general, however, displays 14 may include any desired display technologies.

Displays 14 are used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. For example, an optical coupling system may be used to allow computer-generated content to be optically overlaid on top of a real-world image. In particular, device 10 may have a see-through display system that provides a computer-generated image to a user through a beam splitter, prism, holographic coupler, diffraction grating, or other optical coupler (e.g., an output coupler on a waveguide that is being used to provide computer-generated images to the user) while allowing the user to view real-world objects through the optical coupler and other transparent structures (e.g., transparent waveguide structures, vision-correction lenses and/or other lenses, etc.). Alternatively, device 10 may have a pass-through display system, in which the external environment is imaged by a camera or other optical device, displayed on displays 14, and optionally augmented with virtual content.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, color sensors (e.g., color ambient light sensors or cameras that detect light), microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), strain gauge sensors, and/or other sensors.

User input and other information may be gathered using sensors and other input devices in input-output devices 22. If desired, input-output devices 22 may include other components 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, microphones, buttons, and/or other components. Haptic output devices can produce motion that is sensed by the user (e.g., through the user's fingertips or other body part). Haptic output devices in devices 10 may include actuators such as electromagnetic actuators such as solenoids, motors, piezoelectric actuators, electroactive polymer actuators, vibrators, linear actuators, rotational actuators, actuators that bend bendable members, actuator devices that create and/or control repulsive and/or attractive forces between devices 10 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10).

Electronic device 10 may have housing structures as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, arms or temples in a pair of eyeglasses, goggle housing structures, and/or other head-mounted structures). A head-mounted support structure may be configured to be worn on a head of a user during operation of device 10 and may support displays 14, sensors 16, other components 24, other input-output devices 22, and control circuitry 12.

Figure 2:
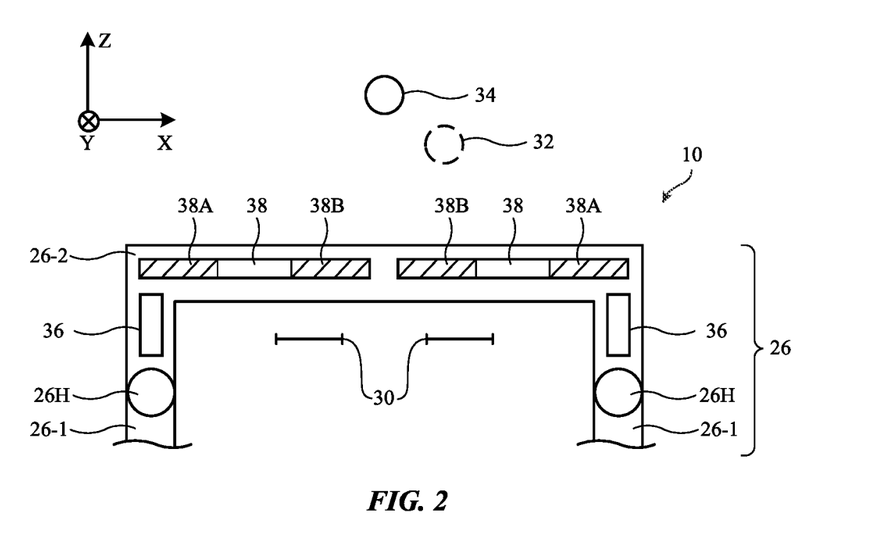
FIG. 2 is a top view of an illustrative head-mounted device in accordance with some embodiments.

FIG. 2 is a top view of electronic device 10 in an illustrative configuration in which electronic device 10 is a head-mounted device. As shown in FIG. 2, electronic device 10 may include head-mounted support structure 26 to house the components of device 10 and to support device 10 on a user's head. Support structure 26 may include, for example, structures that form housing walls and other structures at the front of device 10 (sometimes referred to as a frame, lens support frame, glasses frame, etc.). In particular, support structure 26 may include support structures 26-2 at the front of device 10, which form glasses frame structures such as a nose bridge, a frame portion that supports left and right lenses with embedded waveguides, and/or other housing structures. Support structure 26 may also include additional structures such as straps, glasses arms, or other supplemental support structures (e.g., support structures 26-1) that help to hold the frame and the components in the frame on a user's face so that the user's eyes are located within eye boxes 30. If desired, support structure 26 may include hinges such as hinges 26H. Support structures 26-1 (which may sometimes be referred to as arms or temples) may be coupled to support structures 26-2 (which may sometimes be referred to as a glasses frame, lens frame, or frame) using hinges 26H (e.g., so that the arms of device 10 can be folded parallel to the frame at the front of device 10 when not in use).

During operation of device 10, images are presented to a user's eyes in eye boxes 30. Eye boxes 30 include a left eye box that receives a left image and a right eye box that receives a right image. Device 10 may include a left display system with a left display 14 that presents the left image to the left eye box and a right display system with a right display 14 that presents the right image to the right eye box. In an illustrative configuration, each display system may have an optical combiner assembly that helps combine display images (e.g., computer-generated image 32 of FIG. 2, sometimes referred to as a virtual image) with real-world image light (e.g., light from real-world objects such as object 34 of FIG. 2). Optical combiner assemblies may include optical couplers, waveguides, and/or other components.

As an example, each display system may have a corresponding projector 36, a waveguide 38, and an optical coupler (e.g., a prism and/or other optical coupling element(s)) to couple an image from the projector into the waveguide from the projector. An output coupler on each waveguide may be used to couple the image out of that waveguide towards a respective eye box after the waveguide has guided the image to a location overlapping the eye box.

In the illustrative configuration of FIG. 2, a left projector 36 may produce a left image and a right projector 36 may produce a right image. Left and right waveguides 38 at the front of device 10 may be provided with left and right optical input couplers 38A that respectively receive the left and right images and couple those images into the left and right waveguides. Waveguides 38 then convey the received images laterally towards the center of device 10 in accordance with the principal of total internal reflection. The left and right images (e.g., computer-generated image 32) are coupled out of the waveguides towards eye boxes 30 using output couplers 38B (e.g., gratings, holographic output couplers, or other suitable output couplers). Output couplers 38B are transparent so that a user may view real-world objects such as object 34 from eye boxes 30.

In some embodiments, it may be desirable to determine colors of external objects, such as object 34. As illustrative examples, the determined color may be used as an input color in virtual space (e.g., as part of a virtual image that includes virtual objects in computer-generated image 32), may be used as an input color for a stylus on another device, or may be used to identify colors of objects when purchasing items such as clothes or furniture. To determine the colors of external objects, sensors in the head-mounted device, such as some of sensors 16 of FIG. 1, may be used. An illustrative example of a head-mounted device that has sensors to measure the colors of external objects is shown in FIG. 3.

Figure 3:
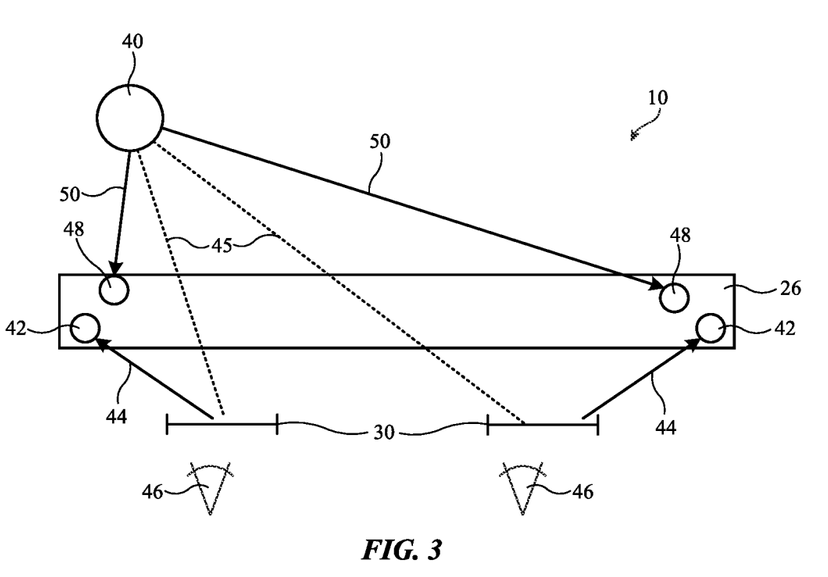
FIG. 3 is a top view of an illustrative head-mounted device having a gaze tracking system and an external optical sensor in accordance with some embodiments.

As shown in FIG. 3, device 10 may include a gaze tracking system having gaze tracking sensors 42 and may include external sensors 48. Gaze tracking sensors 42 (also referred to as gaze trackers herein) may determine an angle/direction of a user's gaze, or may otherwise determine the position of one or both of the user's eyes (e.g., the locations of one or both of the user's pupils). For example, gaze tracking sensors 42 may determine the angle/direction of the gaze of eyes 46 of the user in eye boxes 30. To make this angle/direction determination, gaze tracking sensors 42 may receive light 44 from one or both eyes 46 to make the gaze determination. For example, gaze tracking sensors 42 may include cameras; sensor systems having illuminators that illuminate eyes 46 and optical sensors that measure light that has reflected off of eyes 46; or other optical sensors that track the gaze of eyes 46. In some embodiments, the gaze tracking system may track the gaze of the user, while in other embodiments, a system may track the pupils of the user. Regardless of the method of tracking the user's eyes, however, gaze trackers 42 may determine that a user is looking toward an object. In the illustrative example of FIG. 3, the gaze of eyes 46 may be along angle/direction 45 toward external object 40.

Based on the angle/direction of the gaze of eyes 46, optical sensors 48 may determine the color of an external object that is located in the angle/direction of the gaze. In the example of FIG. 3, external object 40 is at the angle/direction of the user's gaze. Therefore, optical sensors 48 may receive light 50 from external object 40 to determine the color of external object 40.

External optical sensors 48 may be, for example, cameras or directional color ambient light sensors. If optical sensors 48 are cameras, optical sensors 48 may take an image that includes external object 40, and control circuitry in device 10 (such as control circuitry 12 of FIG. 1) may determine the color of external object 40 from the image. For example, the control circuitry may repeatedly determine the color of smaller subscenes in the image until the color of external object 40 is determined. However, this is merely illustrative. In general, the color of external object 40 may be determined from an image in any desired manner.

If optical sensors 48 are directional color ambient light sensors, optical sensors 48 may include an array of photodiodes, each of which has an associated color filter. The color filter of each photodiode may allow one or more wavelengths of light to pass, while blocking other wavelengths. Each photodiode in the array of photodiodes may have a color filter of a different color, or some or all of the photodiodes may have color filters of the same color. By detecting the amount of light that passes through each color filter with the array of photodiodes, a color may be determined.

The color ambient light sensors may generally make color measurements based on the angle of incidence of incident light. For example, the sensors may make directional measurements by incorporating active structures (e.g., structures that are adjusted electronically to allow light in from a given direction and to determine a color in the given direction) or passive structures (e.g., coatings that code the light incident on the ambient light sensors so that the directionality of the light incident on the sensors may be determined). Alternatively or additionally, the color ambient light sensors may correlate the ambient light measurements with an angle of incidence based on an amount of color shift between the object and the sensor. By measuring the light that passes through the different color filters at an angle/direction that corresponds with the user's gaze, the color of the external object may be determined.

If desired, sensors 48 can measure color, reflectivity, and/or other optical properties as a function of angular orientation and/or direction between device 10 and object 40. Color measurements may be represented using color coordinates. Sampled color information and/or other sampled optical characteristics of the object 40 (reflectivity, angular orientation information during sampling, etc.) can then be used by control circuitry in device 10 (e.g., control circuitry 12 of FIG. 1) or may be conveyed wirelessly to another device. Arrangements in which color samples are conveyed to an external device may sometimes be described herein as an example. In general, any optically sampled characteristics of a target object and associated data can be conveyed to an external device.

Color samples may be initiated manually (e.g., in response to user input to one of sensors 16, such as button press input, touch sensor input, force sensor input, etc.), may be initiated by a retinal or other eye input or movement (e.g., a blink or double-blink detected by gaze trackers 42), may be initiated by an auditory input (e.g., a speech command that is detected by a microphone in device 10), and/or may otherwise by initiated in system 8.

In some embodiments, optical sensors 48 may include one or more additional sensors to correct the determined color of the external object. For example, an ambient light sensor may be used to measure colors over an entire external scene that includes the external object. These measurements may then be used for color correction and/or correcting the white balance of the determined external object color (e.g., by comparing the measured scene color(s) to the expected scene color(s), a correction factor may be determined that may then be applied to the external object color). For example, if optical sensors 48 include a camera to determine the color of the external object, the control circuitry may perform color correction and/or white point balancing on an image taken by the camera prior to determining the color of the external object. In this way, additional sensor(s) in electronic device 10 may be used to correct the determined color of the external object.

In general, optical sensors 48 may include one or more cameras, directional color ambient light sensors, or other optical sensors that detect light of external objects. Moreover, gaze trackers 42 may be cameras, ambient light sensors, or other optical sensors that detect the directionality of a user's gaze. Illustrative examples of various optical sensors are shown in FIGS. 4A and 4B.

Figure 4A:
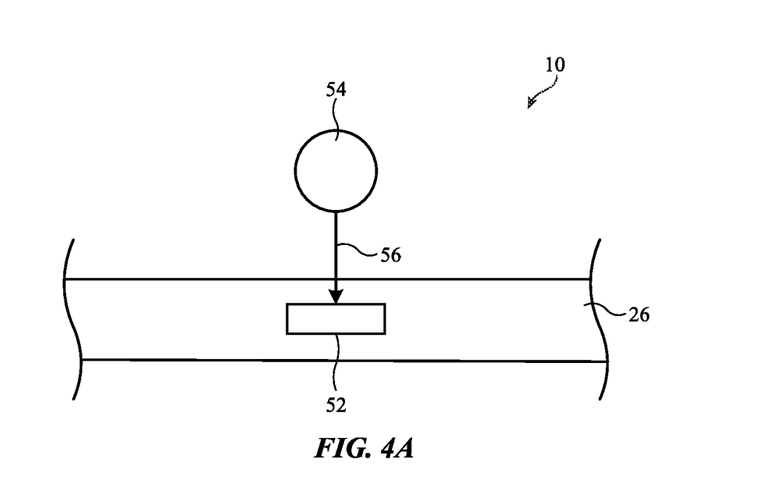
FIG. 4A is a top view of an illustrative head-mounted device having an optical sensor in accordance with some embodiments.

As shown in FIG. 4A, device 10 may include optical sensor 52. Optical sensor 52 may be an external optical sensor that determines colors of external objects (such as optical sensors 48 of FIG. 3), or may be an optical sensor that tracks the gaze of a user (such as gaze tracking sensors 42 of FIG. 3). Optical sensor 52 may receive light 56 from object 54, which may correspond with an external object or with the user's eyes. In this embodiment, optical sensor 52 may be a camera, ambient light sensor, or other sensor that receives light from the environment of device 10. The received light may be analyzed to determine the color or location of external object 54.

For example, if optical sensor 52 is a camera, an image taken by the camera may be analyzed by control circuitry in device 10 to determine the color of object 54, or may be analyzed by the control circuitry to determine the location of object 54 (e.g., the location/direction of a user's eyes). If optical sensor 52 is an ambient light sensor, optical sensor 52 may have a plurality of photodiodes with different color filters. By measuring the amount of light that passes through each color filter and reaches each photodiode, a color of object 54 may be determined.

Figure 4B:
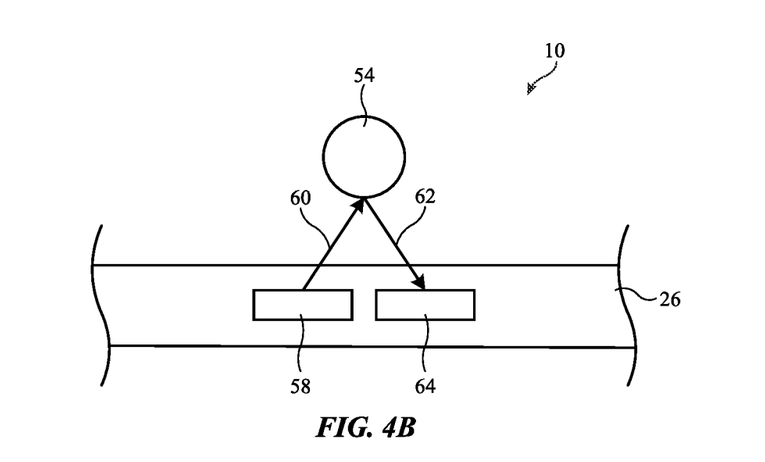
FIG. 4B is a top view of an illustrative head-mounted device having a light-emitting component and an optical sensor in accordance with some embodiments.

Alternatively or additionally, device 10 may include optical sensor 64 and light source 58, as shown in FIG. 4B. Optical sensor 64 may be an external optical sensor that determines colors of external objects (such as optical sensors 48 of FIG. 3), or may be an optical sensor that tracks the gaze of a user (such as gaze tracking sensors 42 of FIG. 3). In operation, light source 58 may illuminate object 54 with light 60. Optical sensor 64 may then detect light 62 that has reflected from object 54. By comparing the known color of emitted light 60 with the measured color of light 62, the color of object 54 may be determined. Alternatively, the reflected light may be used to track the direction of the user's gaze, such as by determining a location of the user's pupil.

Figure 5:
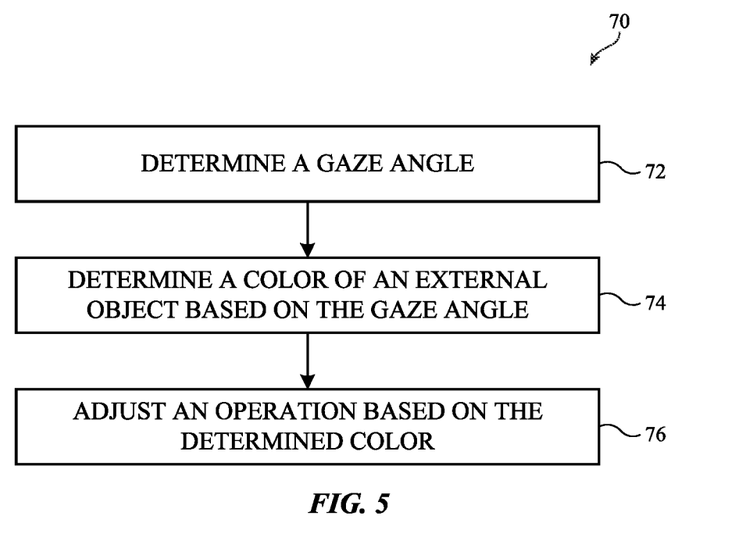
FIG. 5 is a flow chart of illustrative operations involved in using a system in accordance with some embodiments.

An illustrative flowchart with steps that may be used in determining the color of an external object is shown in FIG. 5.

As shown in FIG. 5, flowchart 70 may begin with step 72, at which a gaze angle/direction may be determined. The angle/direction of a user's gaze may be determined using gaze tracking sensors, such as gaze tracking sensors 42 of FIG. 3. The gaze tracking sensors may determine the user's gaze based on light received from one or both of the user's eyes. In some embodiments, a gaze tracking system may also include light-emitting devices that emit light toward the user's eyes, and the gaze tracking sensors may then measure light that has reflected from the eyes to determine the gaze. Determining the user's gaze may include determining the angle and/or direction of the gaze, tracking the user's pupils, or otherwise determining the direction of the user's vision.

At step 74, a color of an external object may be determined based on the angle/direction of the user's gaze. For example, an optical sensor in the electronic device may be used to determine the color of an external object at the angle/direction of the user's gaze. In other words, the optical sensor may determine the color of an object at which the user is looking. The optical sensor may determine the color of the external object in response to a manual input, such as the press of a button on the electronic device, in response to an auditory input, or in response to a retinal input (e.g., an eye movement), such as a blink or double-blink of one or both eyes, as examples.

The optical sensor(s) used to determine the color of the external object may include cameras or color ambient light sensors, as examples. If the optical sensor is a camera, the optical sensor may take an image that includes the external object, and control circuitry in the device may determine the color of the external object from the image. For example, the control circuitry may repeatedly determine the color of smaller subscenes in the image until the color of the external object is determined.

Alternatively, if the optical sensor is a color ambient light sensor, the optical sensor may include an array of photodiodes, each of which has a different color filter. By measuring the light that passes through each color filter and that is detected by each photodiode, a color of the external object may be determined.

The color ambient light sensor may generally make color measurements based on the angle of incidence of incident light. For example, the sensor may make directional measurements by incorporating active structures (e.g., structures that are adjusted electronically to allow light in from a given direction and to determine a color in the given direction) or passive structures (e.g., coatings that code the light incident on the ambient light sensors so that the directionality of the light incident on the sensors may be determined). Alternatively or additionally, the color ambient light sensors may correlate the ambient light measurements with an angle of incidence based on an amount of color shift between the object and the sensor. By measuring the light that passes through the different color filters at an angle/direction that corresponds with the user's gaze, the color of the external object may be determined.

In some embodiments, the optical sensors may include one or more additional sensors to correct the determined color of the external object. For example, an ambient light sensor may be used to determine colors over an entire external scene that includes the external object. These colors may then be used for color correction and/or correcting the white balance of the determined external object color (e.g., by comparing the measured scene color(s) to the expected scene color(s), a correction factor may be determined that may then be applied to the external object color). For example, if the optical sensors include a camera to determine the color of the external object, the control circuitry may perform color correction and/or white point balancing on an image taken by the camera based on the ambient light sensor measurements prior to determining the color of the external object. In this way, additional sensor(s) in the electronic device may be used to correct the color of the external object that is determined using a camera and/or a directional color ambient light sensor.

In addition to measuring the color of the external object, the optical sensor(s) may also measure other optical properties, such as the reflectivity of the external object, if desired.

At step 76, an operation may be adjusted based on the determined color of the external object. For example, an input color may be adjusted to be the same as the determined color. The input color may be used in virtual space (e.g., in an augmented reality space created by the displays in a head-mounted device), or may be used for input on a secondary device. In embodiments in which the determined color is to be used as an input color on a secondary device, the head-mounted device may send the determined color to the secondary device via a wireless link, as an example.

Alternatively, the determined color may be used for calibrating displays, calibrating printers, making health-related measurements, identifying paint colors (e.g., when attempting to identify a color of paint to match an existing painted object), identifying colors for home applications, furniture, or other applications (e.g., selecting cosmetics), identifying food attributes, identifying colors associated with art and design projects, etc.

Figure 6:
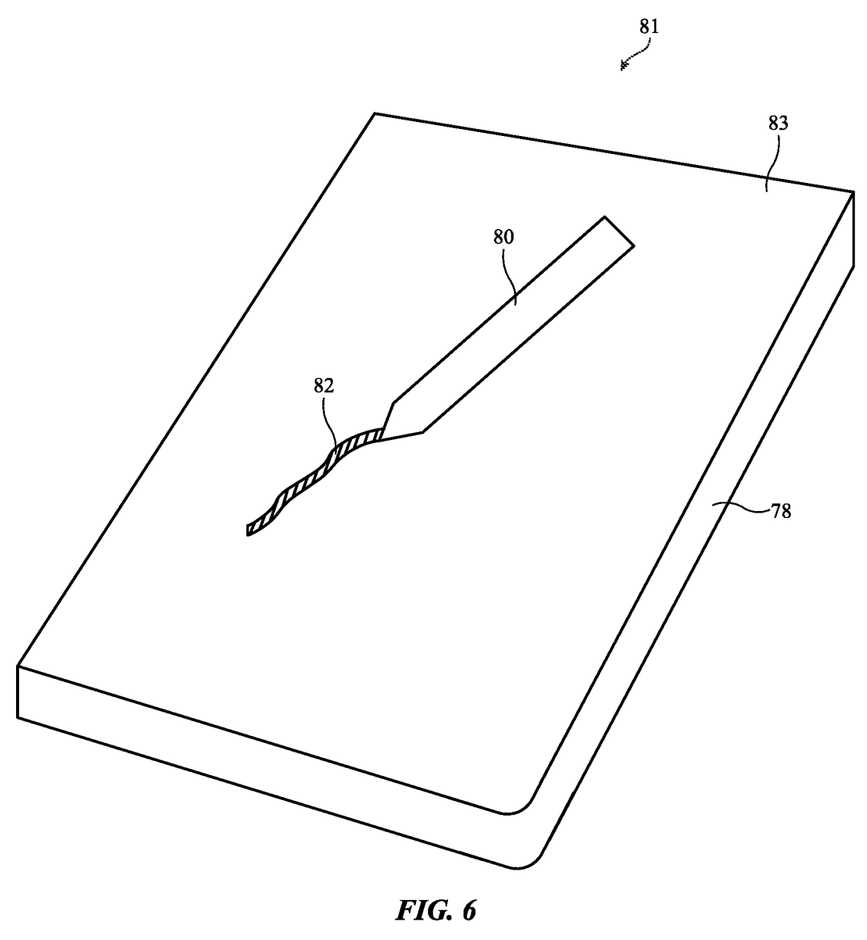
FIG. 6 is a perspective view of a portion of an illustrative system with electronic devices in accordance with some embodiments.

An illustrative system in which the determined color is used as an input on a secondary device is shown in FIG. 6. In particular, FIG. 6 shows the use of an input device such as a computer stylus.

As shown in FIG. 6, system 81 may include an input device such as device 80 (e.g., a computer stylus) and additional electronic equipment such as device 78 (e.g., a tablet computer, cellular telephone, or other device with a display). Display 83 of device 78 may be touch sensitive. For example, the display may include a two-dimensional capacitive touch sensor array that overlaps an array of pixels configured to display an image. Electrodes at a tip of device 80 may emit electromagnetic signals that are detected by the touch sensor of display 83. This allows the tip to be used to draw on-screen items such as line 82 on the screen (e.g., using a drawing program or other software running on device 78). Signals from the tip may also be used to make menu selections, to manipulate visual content displayed on other devices in system 81, and/or may otherwise be used to provide computer stylus input to system 81. Device 80 may include wireless circuitry for communicating with corresponding wireless communications circuitry in device 78 (e.g., over a Bluetooth® link or other wireless link).

Device 78 and/or device 80 can use a sampled color (or other sampled surface characteristic) when new content is being drawn on the display. For example, device 78 and/or device 80 may receive a color from another device, such as head-mounted device 10, that has been measured from an external object. The measured color may be placed in a color palette in a drawing program, if desired. A user of device 78 or device 80 can then assign the color to a brush in a drawing program and can draw lines such as line 82 or other items using this color.

Although FIG. 6 shows using device 80 to create line 82 on device 78, this is merely illustrative. In general, any desired input, such as a touch from a user, an auditory input, etc., may be used to create a virtual object on device 78, and the virtual object may have the color corresponding to the external object.

Device 80, device 78, and/or other equipment in system 8 (e.g., a remote server and/or other electronic equipment) can also use measured colors for calibrating displays, calibrating printers, making health-related measurements, identifying paint colors (e.g., when attempting to identify a color of paint to match an existing painted object), identifying colors for home applications or other applications (e.g., selecting cosmetics), identifying food attributes, identifying colors associated with art and design projects, etc.

System 8 may gather and use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A head-mounted device configured to sense an external object, comprising:
   a head-mountable housing;
   a gaze tracking system in the head-mountable housing, wherein the gaze tracking system is configured to determine a gaze angle;
   an optical sensor in the head-mountable housing, wherein the optical sensor is configured to determine a color of the external object based on the gaze angle;
   an ambient light sensor in the head-mountable housing; and
   control circuitry in the head-mountable housing, wherein the control circuitry is configured to adjust the determined color based on measurements from the ambient light sensor.

2. The head-mounted device of claim 1, wherein the optical sensor comprises a camera that is configured to take an image of the external object.

3. The head-mounted device of claim 2, wherein the control circuitry is configured to determine the color of the external object based on the image and the measurements from the ambient light sensor.

4. The head-mounted device of claim 3, wherein the control circuitry is configured to perform color correction or white point correction on the image to form a corrected image based on the measurements from the ambient light sensor.

5. The head-mounted device of claim 4, wherein the control circuitry is configured to determine the color of the external object based on the corrected image.

6. The head-mounted device of claim 1, wherein the optical sensor comprises a directional color ambient light sensor.

7. The head-mounted device of claim 1, wherein the optical sensor is configured to determine the color of the external object in response to an input.

8. The head-mounted device of claim 7, further comprising:
   a button coupled to the head-mountable housing, wherein the input comprises a press of the button.

9. The head-mounted device of claim 8, further comprising:
   a microphone in the head-mountable housing, wherein the input comprises an audible input that is detected by the microphone.

10. The head-mounted device of claim 7, wherein the input comprises an eye movement that is detected by the gaze tracking system.

11. The head-mounted device of claim 1, wherein the gaze tracking system comprises a camera or an additional ambient light sensor that is configured to track an eye of a user to determine the gaze angle.

12. A system configured to detect an external object, comprising:
   a head-mounted device, comprising:
      a gaze tracking system configured to determine a gaze angle, and
      an optical sensor configured to determine a color of the external object based on the gaze angle;
   a stylus; and
   an electronic device, wherein the stylus is configured to provide input to the electronic device, and wherein a color of the input is configured to be changed based on the determined color of the external object.

13. The system of claim 12, wherein the electronic device comprises a display, and wherein the stylus is configured to provide the input on the display.

14. The system of claim 12, wherein the optical sensor comprises a camera that is configured to take an image of the external object, the head-mounted device further comprising:
   control circuitry configured to determine the color of the external object based on the image.

15. The system of claim 14, wherein the head-mounted device further comprises:
   an ambient light sensor, wherein the control circuitry is configured to correct the image based on measurements from the ambient light sensor prior to determining the color of the external object.

16. The system of claim 12, wherein the optical sensor comprises a directional color ambient light sensor that is configured to determine the color of the external object.

17. An electronic device configured to be worn on a head of a user and configured to sense external light, the electronic device comprising:
   a housing;
   a gaze tracker in the housing, wherein the gaze tracker is configured to determine a gaze angle; and
   an optical sensor in the housing, wherein the optical sensor is configured to determine a color of the external light at the gaze angle in response to an input, and wherein the optical sensor comprises a directional color ambient light sensor that is configured to be electronically adjusted to allow light from a given direction based on the gaze angle.

18. The electronic device of claim 17, wherein the gaze tracker comprises a sensor that is configured to track eyes of the user to determine the gaze angle.

* * * * *